United States Patent
Jing et al.

(10) Patent No.: US 10,316,987 B2
(45) Date of Patent: Jun. 11, 2019

(54) FIXED LEVER AND PIN ASSEMBLY FOR STABILIZING GAS FLOW AND PRESSURE REGULATION OF A FLUID REGULATOR

(71) Applicant: Fisher Regulators (Shanghai) Co., Ltd., Shanghai (CN)

(72) Inventors: Chen Jing, Shanghai (CN); Song Xiaozhang, Shanghai (CN); Zhu Chenchen, Shanghai (CN); Ji Feifei, Shanghai (CN)

(73) Assignee: Fisher Regulators (Shanghai) Co., Ltd., Shanghai (CN)

( * ) Notice: Subject to any disclaimer, the term of this patent is extended or adjusted under 35 U.S.C. 154(b) by 164 days.

(21) Appl. No.: 15/069,446

(22) Filed: Mar. 14, 2016

(65) Prior Publication Data

US 2017/0067576 A1 Mar. 9, 2017

(30) Foreign Application Priority Data

Sep. 6, 2015 (CN) .......................... 2015 1 0560719

(51) Int. Cl.
| | | |
|---|---|---|
| G05D 11/00 | (2006.01) |
| F16K 31/528 | (2006.01) |
| F16K 17/04 | (2006.01) |
| F16K 17/32 | (2006.01) |
| F16K 17/34 | (2006.01) |
| G05D 16/06 | (2006.01) |

(52) U.S. Cl.
CPC ........ *F16K 31/5288* (2013.01); *F16K 17/048* (2013.01); *F16K 17/32* (2013.01); *F16K 17/34* (2013.01); *G05D 16/0686* (2013.01); *Y10T 137/261* (2015.04); *Y10T 137/7831* (2015.04)

(58) Field of Classification Search
CPC ...................... Y10T 137/261; Y10T 137/7831
See application file for complete search history.

(56) References Cited

U.S. PATENT DOCUMENTS

| | | | | | |
|---|---|---|---|---|---|
| 2,319,659 | A | * | 5/1943 | Carnes ................. | F16K 17/048 137/494 |
| 2,616,659 | A | * | 11/1952 | Grahling ............ | G05D 16/0683 137/505.46 |
| 2,619,983 | A | * | 12/1952 | Roberts ................. | F16K 31/165 137/116.5 |
| 2,729,236 | A | * | 1/1956 | Valince ..................... | F15C 3/00 137/116.5 |

(Continued)

OTHER PUBLICATIONS

"Fulcrum", Merriam-Webster. Printed May 2018.*

*Primary Examiner* — Robert K Arundale
(74) *Attorney, Agent, or Firm* — Marshall, Gerstein & Borun LLP (57) ABSTRACT

A fixed lever and pin assembly may include a lever body having a front end, a back end, and an arm connecting the front end and the back end. The front end of the lever body may be operatively coupled to a control element of a regulator. The arm may be adapted to operatively couple to an actuator of a regulator. A pin may be fixed to the front end of the lever body and may be disposed through the front end in a direction perpendicular to first and second parallel sides of the lever body. The fixed lever and pin assembly may be an integrated piece and the pin may prevent the lever body from moving independently from the pin.

20 Claims, 5 Drawing Sheets

(56) References Cited

U.S. PATENT DOCUMENTS

| | | | | |
|---|---|---|---|---|
| 3,042,064 A | * | 7/1962 | Pommersheim | F16K 31/165 |
| | | | | 137/116.5 |
| 3,525,356 A | * | 8/1970 | Cameron | G05D 16/0688 |
| | | | | 137/505.15 |
| 3,599,658 A | * | 8/1971 | Kruzan | G05D 16/0683 |
| | | | | 137/116.5 |
| 3,705,599 A | * | 12/1972 | Sheward | G05D 16/0688 |
| | | | | 137/116.5 |
| 3,892,255 A | * | 7/1975 | Johnson | G05D 16/0683 |
| | | | | 137/116.5 |
| 3,971,410 A | * | 7/1976 | St. Clair | G05D 16/0694 |
| | | | | 137/116.5 |
| 4,344,456 A | * | 8/1982 | Hostetler | F16K 21/18 |
| | | | | 137/403 |
| 4,491,149 A | * | 1/1985 | Trinkwalder | G05D 16/0688 |
| | | | | 137/458 |
| 5,697,398 A | * | 12/1997 | Gidney | G05D 16/0683 |
| | | | | 137/484.8 |
| 2006/0065307 A1 | * | 3/2006 | Schmidt | G05D 16/02 |
| | | | | 137/505.46 |
| 2014/0261787 A1 | * | 9/2014 | Blanchard | G05D 16/0683 |
| | | | | 137/505 |
| 2015/0083531 A1 | * | 3/2015 | Abhold | B62K 23/06 |
| | | | | 188/151 R |
| 2017/0067576 A1 | * | 3/2017 | Jing | F16K 31/5288 |

* cited by examiner

FIXED LEVER AND PIN ASSEMBLY FOR STABILIZING GAS FLOW AND PRESSURE REGULATION OF A FLUID REGULATOR

FIELD OF THE INVENTION

The present disclosure generally relates to fluid control devices such as fluid regulators and, more particularly, to a fluid regulator having a fixed lever and pin assembly.

BACKGROUND

For typical gas distribution systems, the supplied pressure may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a fluid regulator. Therefore, fluid regulators are implemented in these distribution systems in order to ensure that the delivered gas meets the requirements of the end-user facilities.

Figure 1:
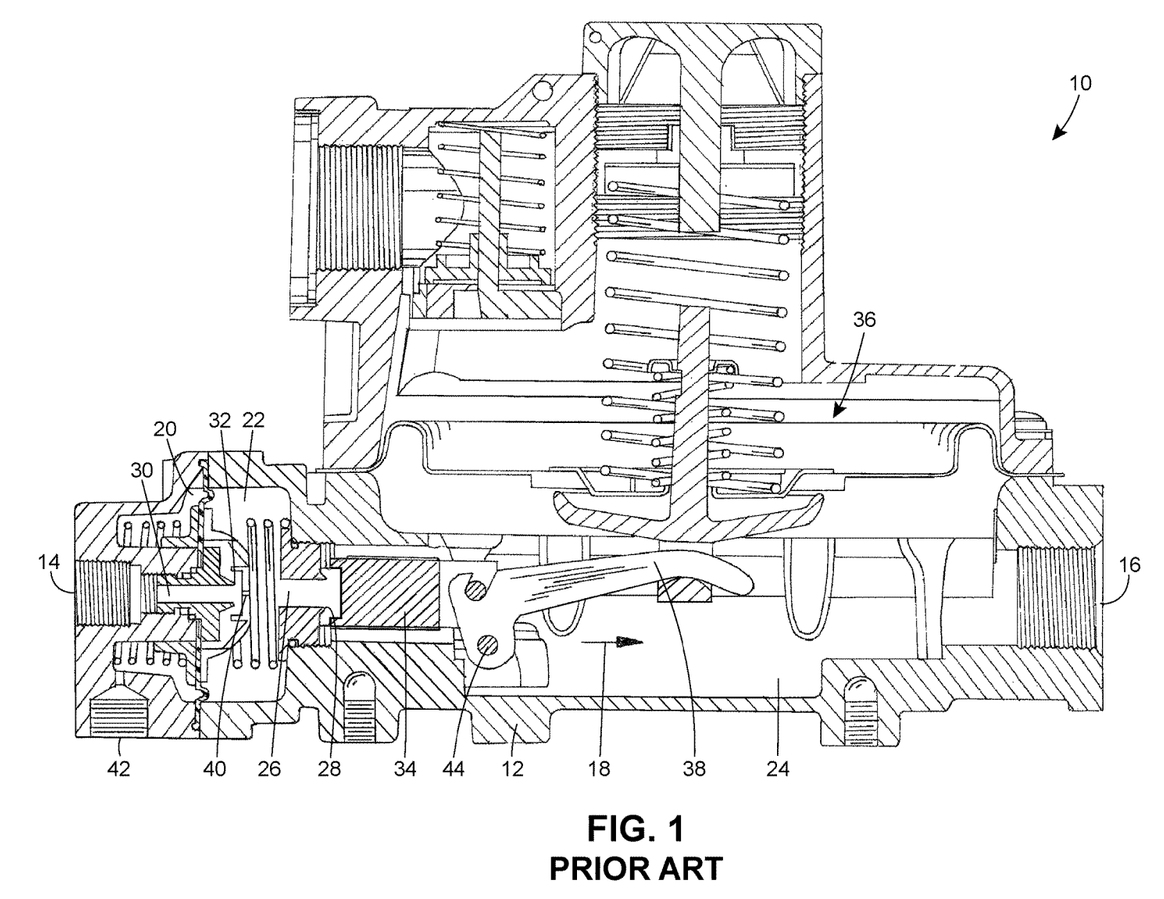
FIG. 1 is a cross-sectional view of a conventional dual stage fluid regulator assembled in accordance with the teachings of the prior art.

Fluid regulators, which regulate the fluid pressure and/or flow to maintain a selected output pressure, are generally well known in the art. One type of fluid regulator is a single stage pressure regulator, which acts to reduce the incoming or source pressure to the outlet or delivery pressure in a single step. Another type of fluid regulator is a dual stage regulator, which reduces the inlet pressure to the outlet pressure in two steps. A known dual stage fluid regulator 10 is illustrated in FIG. 1. The fluid regulator 10 includes a regulator body 12 defining a fluid inlet 14 and a fluid outlet 16 connected by a fluid flow path 18 that extends generally through the body 12. The fluid regulator 10 is generally divided into a number of chambers, including a first chamber 20, a second chamber 22, and a third chamber 24. The fluid regulator 10 includes a first stage orifice 26 disposed in the fluid flow path 18 and leading to a first stage seat 28, and a second stage orifice 30 disposed in the fluid flow path 18 and leading to a second stage seat 32. A first stage control element 34 is disposed within the fluid flow path 18 and is shiftable between an open position (as shown in FIG. 1) in which the first stage control element 34 is spaced away from the first stage seat 28, and a closed position in which the first stage control element 34 is seated against the first stage seat 28. The fluid regulator 10 includes an actuator 36 which is attached to the regulator body 12. The actuator 36 is attached to or otherwise operatively coupled to the first stage control element 34, and is arranged to respond to fluid pressure changes in the fluid outlet 16 and to move the first stage control element 34 between the open position and the closed position in order to control the flow of the process fluid through the first stage orifice 26. The actuator 36 may be conventional, and moves a lever 38 operatively coupled to the first stage control element 34 in order to open or close the first stage control element 34, depending on pressure conditions in the third chamber 24. The actuator 36 includes a diaphragm, load springs, and a suitable stem or other suitable linkage as would be known. A second stage control element 40 is disposed within the fluid flow path 18 and is shiftable between an open position (as shown in FIG. 1) in which the second stage control element 40 is spaced away from the second stage seat 32, and a closed position in which the second stage control element 40 is seated against the second stage seat 32 (in which the control element 40 would be positioned to the left of the open position of FIG. 1). The second stage control element 40 is arranged to respond to fluid pressure changes and to control flow of a process fluid through the second stage orifice 30.

In operation, the inlet 14 is exposed to a supply pressure $P_i$, while the outlet 16 is exposed to an outlet or operating pressure $P_O$, which is the operating pressure required by the devices located downstream requiring gas at the lower operating pressure. The inlet pressure $P_i$ is higher than the outlet or operating pressure $P_O$. The first chamber 20 is in flow communication with a vent 42 to atmosphere, and consequently the first chamber 20 is at atmospheric pressure $P_a$. The second chamber 22 is typically at a middle pressure $P_m$ between the inlet pressure $P_i$ and the outlet pressure $P_O$. During operation, the inlet pressure $P_i$ is typically sufficiently high to keep the second stage control element 40 in the open position as shown in FIG. 1. If the inlet pressure $P_i$ drops sufficiently, then the pressure within the second chamber 22 causes the second stage control element 40 to shift to the left toward, or to, the closed position, closing the second stage. Operation of the first stage is also conventional. When the pressure in the third chamber 24 drops, meaning pressure at the gas devices downstream has dropped, the load springs in the actuator 36, which load springs bear against a diaphragm of the actuator 36, overcome the gas pressure against the diaphragm. Consequently, the actuator 36 moves the stem and/or diaphragm plate downward, rotating the lever 38 in a downward direction to move the first stage control element 34 away from the seat 32, feeding additional gas into the third chamber 24. Conversely, when the pressure in the third chamber 24 increases, the actuator causes the first stage control element 34 to move toward, or to, the seat 28, lowering the pressure in the third chamber 24.

As illustrated in FIG. 1, the lever 38 is secured to the regulator body 12 by a pin 44 and is operatively coupled to the first control element 34 and the actuator 36. The pin 44 is disposed within a cavity formed in the regulator body 12 such that the walls of the cavity limit the translational movement of the pin 44. The lever 38 is generally attached to the regulator body 12 by the pin 44 at a front end and freely rotates about the pin 44 when the actuator 36 moves the lever 38 in a vertical direction at a back end. Upon downward vertical movement of the back end, the lever 38 rotates about the pin 44 and pulls the control element 34 in the direction of flow 18 and away from the first seat 28. The positioning of the lever 38 may be carefully calibrated such that when the actuator 36 moves the lever 38 in a vertical direction, the lever rotates relative to the pin 44, causing the control element 34 to move away from or toward the first stage seat 28 a predetermined distance. The lever 38 and the pin 44 are rotatably connected, i.e. the lever 38 and the pin 44 rotate relative to each other and share a common axis of rotation. The pin 44 is rotatably connected to the lever 38 at an aperture having enough clearance for a loose fit allowing the lever 38 to rotate and slide freely along the pin 44. In a highly pressurized environment, the lever 38 may become loose and may swing in a horizontal direction relative to the axis of the pin, creating a flutter.

The lever 38 and the pin 44 provide an important function of operatively coupling the actuator 36 with the control element 34. The lever 38 rotates about the pin 44, converting vertical movement of the actuator 36 to translational movement of the control element 34. Each of the vertical movement of the actuator 36, rotation of the lever 38, and translational movement of the control element 34 is predetermined for the actuator 36 to accurately respond to outlet pressure and to control the flow of fluid through the first stage orifice 26. In a fluid regulator 10, high pressurized fluids (liquids or gases) flow through the fluid flow path 18 and may move the lever 38 independently from the pin 44. Even slight deviations from the predetermined actions of the actuator 36 and the control element 34 (caused by the additional movements of the lever 38) may significantly disrupt the flow of process fluid through the regulator 10. For example, frequent or repetitive lever movements and flutter create wasted motion and may gradually wear the coupling surfaces of the pin 44 and the lever 36, the coupling surfaces of the lever 38 and the control element 34, the coupling surfaces of the lever 38 and the actuator 36, and other mechanical parts within the regulator 10. The lever flutter and horizontal swing may negatively affect the responsiveness and/or accuracy of the lever 38 to the vertical movement of the actuator 36, and thereby the responsiveness and/or accuracy of the control element 34 to the rotation of the lever 38. As a result, the control element 34 may unexpectedly move away or toward the stage seat 32 or become unresponsive to the movements of the actuator 36, leading to inaccuracy, inconsistent flow capacities, instability, slow response time, expedited system wear, and system failure. Accordingly, it may be desirable to provide a fluid regulator exhibiting reduced or minimized adverse effects due to environmental and/or mechanical factors.

SUMMARY

According to some aspects of the disclosure, a fixed lever and pin assembly, where the pin is fixed to the lever so that the pin and lever move as an integrated unit rather than as separate parts, may reduce instability within a fluid regulator by limiting the lever from moving horizontally along the axis of the pin.

In one arrangement, a lever and pin assembly for a fluid regulator may include a regulator body, a control element disposed within the regulator body to control flow of fluid through the regulator body, and a lever and a pin. The lever may include a front end and a back end, where the front end may be operatively coupled to the control element. The pin may include a central axis disposed through the front end of the lever and the pin may be rotatably coupled to the regulator body. The lever may rotate about the central axis of the pin and may move the control element between a first position and a second position. The lever may be fixed to the pin to minimize horizontal movement of the lever and to provide stability to the regulator. This arrangement may be operatively coupled to an actuator in a fluid regulator at a back end of the lever. In operation, the actuator may be arranged to respond to fluid pressure changes in a fluid outlet by moving the back end of the lever in a vertical direction, causing the control element to move and to control flow of the process fluid through an orifice.

Another arrangement includes a method of improving stability in a fluid regulator and may include a step of providing a fluid regulator and providing a lever and pin assembly to be carried by a regulator body, where the lever and pin assembly may include a lever and a pin, the lever having a first end and a second end. The method may include operatively coupling the lever and pin assembly to a control element at the first end of the lever and operatively coupling the lever and pin assembly to an actuator at the second end of the lever, wherein the actuator may be arranged to respond to fluid pressure changes in a fluid outlet and to move the second end of the lever in a vertical direction, causing the control element to move between an open position and a closed position to control flow of the process fluid through an orifice. The method may include fixing the lever to the pin so that the lever does not move relative to the pin to prevent the lever from moving horizontally within the regulator when such movement is not caused by the control element and to prevent the lever from moving independently from the pin.

Another arrangement includes a lever and pin device that may include a lever body having a front end and a back end, and a pin fixed to the front end of the lever body. The front end of the lever body may be operatively coupled to a control element of a regulator. The device may include an arm connecting the front end and the back end of the lever body, wherein the back end may be adapted to operatively couple to an actuator of a regulator. The pin may be disposed through the front end in a direction perpendicular to first and second parallel sides of the lever body. The lever and pin device is an integrated piece, and the pin may prevent the lever body from moving independently of the pin.

Any one of the aforementioned arrangements may include the following structures. The pin may be attached to the lever at an aperture in the front end of the lever wherein a mating surface of the aperture may fixedly mate with a mating surface of the pin, preventing the lever from moving independently from the pin.

DETAILED DESCRIPTION

Although the following text sets forth a detailed description of one or more exemplary embodiments of the fixed lever and pin assembly, it should be understood that the legal scope of the fixed lever and pin assembly is defined by the words of the claims set forth at the end of this patent. The following detailed description is to be construed as exemplary only and does not describe every possible embodiment of the fixed lever and pin assembly, as describing every possible embodiment would be impractical, if not impossible. Numerous alternative embodiments could be implemented, using either current technology or technology developed after the filing date of this patent, and such alternative embodiments would still fall within the scope of the claims defining the fixed lever and pin assembly.

In one arrangement, a fluid regulator, includes a regulator body having a fluid inlet and a fluid outlet connected by a fluid flow path. An orifice may be disposed in the fluid flow path and may lead to a seat. A control element may be disposed within the fluid flow path and may be shiftable between an open position spaced away from the seat and a closed position seated against the seat. An actuator may be attached to the regulator body and may be operatively coupled to a lever and pin assembly. The lever and pin assembly may include a lever fixed to a pin, wherein the lever may include a front end operatively coupled to the control element and a back end operatively coupled to the actuator. The pin may rotate relative to the regulator body. In operation, the actuator may be arranged to respond to fluid pressure changes in the fluid outlet by moving the back end of the lever in a vertical direction, causing the control element to move between the open position and the closed position to control flow of the process fluid through the orifice. The fixed lever and pin assembly may minimize a horizontal movement of the lever and may prevent instances of instability within the fluid regulator.

In another arrangement, a lever and pin assembly for a fluid regulator may include a regulator body, a control element disposed within the regulator body to control flow of fluid through the regulator body, and a lever and a pin. The lever may include a front end and a back end, where the front end may be operatively coupled to the control element. The pin may include a central axis disposed through the front end of the lever and the pin may be rotatably coupled to the regulator body. The lever may rotate about the central axis of the pin and may move the control element between a first position and a second position. The lever may be fixed to the pin to minimize horizontal movement of the lever and to provide stability to the regulator.

Another arrangement includes a method of improving stability in a fluid regulator. The method may include providing a fluid regulator having a regulator body with a fluid inlet and a fluid outlet connected by a fluid flow path. The regulator may further have an orifice disposed in the fluid flow path and a seat, and a control element disposed within the fluid flow path and shiftable between an open position spaced away from the seat and a closed position seated against the seat. The method may include attaching an actuator to the regulator body and providing a lever and pin assembly to be carried by the regulator body, where the lever and pin assembly may include a lever and a pin, the lever having a first end and a second end. The method may include operatively coupling the lever and pin assembly to the control element at the first end of the lever and operatively coupling the lever and pin assembly to the actuator at the second end of the lever, wherein the actuator may be arranged to respond to fluid pressure changes in the fluid outlet and to move the second end of the lever in a vertical direction, causing the control element to move between the open position and the closed position to control flow of the process fluid through the orifice. The method may include fixing the lever to the pin so that the lever does not move relative to the pin to prevent the lever from moving horizontally within the regulator when such movement is not caused by the control element and to prevent the lever from moving independently from the pin.

Another arrangement includes a lever and pin device having a lever body having a front end, a back end, first and second parallel sides, a top outer edge, and a bottom outer edge, a notch disposed at the top outer edge of the front end, the notch adapted to operatively couple the front end of the lever body to a control element of a regulator. The device may include an arm connecting the front end and the back end of the lever body, wherein the back end may be adapted to operatively couple to an actuator of a regulator. A pin may be fixed to the front end of the lever body and may be disposed through the front end in a direction perpendicular to the first and second parallel sides, wherein the lever and pin device is an integrated piece and the pin may prevent the lever body from moving independently of the pin.

Any one of the aforementioned arrangements may include any one or more of the following features. The pin may be attached to the lever at an aperture in the front end of the lever, wherein a mating surface of the aperture may fixedly mate with a mating surface of the pin, preventing the lever from moving independently from the pin.

The pin may be secured in a cavity of the regulator body, and the cavity may be adapted to prevent horizontal and vertical movement of the pin.

The lever may include an aperture of a first diameter and the pin may include a second diameter. The second diameter may be larger than the first diameter, whereby the pin may be held to the lever by a tight friction fit in the aperture.

The lever may have a non-circular aperture adapted to receive the pin, and the pin may have a non-circular cross-section that corresponds with the non-circular aperture.

The lever may be fixed to the pin by welding.

The regulator may include a second orifice disposed in the fluid flow path and leading to a second stage seat, a second control element disposed within the fluid flow path and shiftable between an open position spaced away from the second seat and a closed position seated against the second seat, the second control element arranged to respond to fluid pressure changes to control flow of the process fluid through the second orifice.

Figure 2:
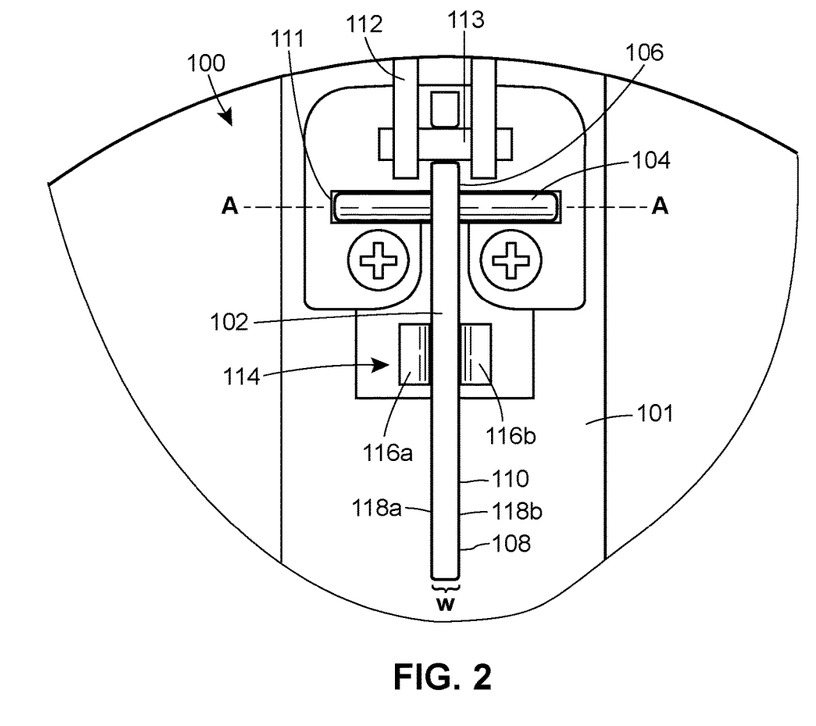
FIG. 2 is a partial top view of a regulator body and an arrangement of a fixed lever and pin assembly coupled to a control element according to the present disclosure.
Figure 3:
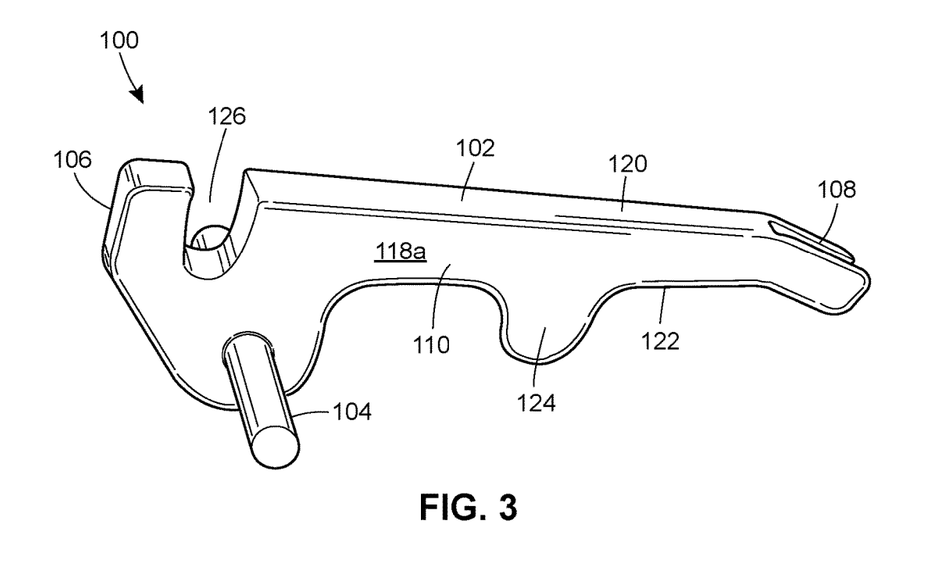
FIG. 3 is a perspective view of the fixed lever and pin assembly of FIG. 2.
Figure 4:
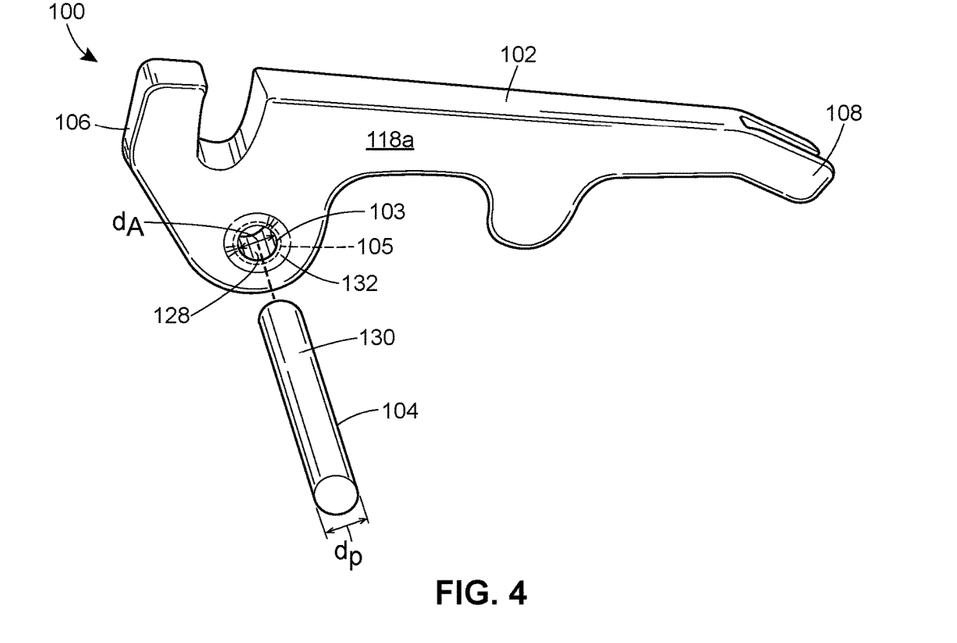
FIG. 4 is an exploded perspective view of an exemplary fixed lever and pin assembly.

Referring now to FIGS. 2-4, a fixed lever and pin assembly 100 may replace the lever and the pin installed in fluid regulators as in FIG. 1 in order to decrease instances of lever flutter and stabilize fluid flow. The fixed lever and pin assembly 100 may be manufactured as a single piece or as separate elements that are subsequently fixed together to form an integrated unit. FIG. 2 illustrates a top view of the fixed lever and pin assembly 100 disposed within a fluid flow path of a regulator body 101 like that of FIG. 1. The fixed lever and pin assembly 100 includes a lever body 102 and a pin 104, the lever body 102 having a front end 106, a back end 108, and an arm 110 connecting the front and back ends 106, 108. The pin 104 is fixed to the lever body 102 at the front end 106 and rotatably couples to the regulator body 101 such that the lever 102 and the pin 104 rotate as a unit about an axis A-A of the pin 104. As discussed further below, the lever body 102 and the pin 104 are fixed together, either as a single manufactured device, or by joining the lever body 102 and the pin 104 as an integrated assembly such as by a friction fit or by welding. In contrast to the lever and the pin of FIG. 1, the fixed lever and pin assembly 100 prevents the lever body 102 from moving independently from the pin 104, thereby reducing any horizontal movement and/or flutter of the lever body 102 along the axis A-A of the pin 104.

The fixed lever and pin assembly 100 operatively couples a control element 112 with an actuator (not illustrated). The pin 104 is disposed in a cavity 111 formed in the regulator body 101 and is limited to rotational movement by a plurality of cavity walls. The cavity walls substantially surround opposite ends of the pin 104, pivotably secure the fixed lever and pin assembly 100 to the regulator body 101, and limit the fixed lever and pin assembly 100 to rotational movement about the axis A-A of the pin 104. The control element 112, which is disposed in the regulator body 101 and located upstream relative to the actuator, is operatively coupled to the fixed lever and pin assembly 100 at the front end 106 of the lever body 102. A coupler 113 of the control element 112, such as a bar or loop, rotatably and/or slidably couples to a coupler of the front end 106 of the lever body 102, which in this case is a notch 126. Although not illustrated in FIG. 2, the actuator may be conventional and is operatively coupled to the back end 108 of the lever body 102. The actuator responds to changes in outlet pressure and moves the back end 108 of the lever body 102 in a vertical direction, thereby causing the front end 106 of the lever body 102 to rotate about the axis A-A of the pin 104, and move the control element 112 toward and away from a seat.

FIG. 2 also illustrates a damper 114 that is installed in the regulator body 101 and located beneath the lever arm 110. The damper 114, such as a spring clip or guide, provides first and second prongs 116a, 116b that are adapted to slidably grip a lobe 124 of the arm 110 of the lever body 102. The first and second prongs 116a, 116b are separated by a gap which may be selected so that the first and second prongs 116a, 116b may apply a predetermined dampening force to the lever body 102 as the lever arm 110 pivots up and down. In FIG. 2, the damper 114 is in a biased position, i.e. the lever arm 110 displaces the first and second prongs 116a, 116b outwardly to a selected force, and first and second sides 118a, 118b of the lever body 102 slidably engage the first and second prongs 116a, 116b, respectively. As the lever arm 110 moves vertically through the gap between the prongs 116a, 116b, the arm 110 biases the first prong 116a and the second prong 116b apart in opposite directions parallel to the horizontal axis A-A. In operation, as the actuator moves the back end 108 of the lever body 102 in the vertical direction, rotating the fixed lever and pin assembly 100 about the axis A-A of the pin 104, and pulling the control element 112 toward and away from the seat, the damper 114 contacts the lever arm 110 and applies a dampening force, for example by squeezing and/or clamping, to the lever body 102. Because the lever body 102 is fixed to the pin 104 which is held in place by the cavity walls, the lever body 102 cannot move in the horizontal direction along the A-A axis.

The fixed lever and pin assembly 100 provides stability within the regulator, for example, by reducing instances of a horizontal flutter which may disrupt the precise dampening force applied by the damper 114. For example, horizontal movement, such as a rapid flutter and swing, of the lever arm 110 may cause the gap between the prongs 116a, 116b to widen, thereby affecting the precise location of each prong 116 and the predetermined and/or desired dampening force applied to the arm 110 when the arm 110 moves up and down through the gap. For example, a damper 114 having a tight-fitting gap (relative to a width w) applies a dampening force to the lever arm 110, requiring the lever arm 110 to bias the prongs 116a, 116b along the A-A axis as the lever arm 110 moves through the gap. A damper 114 having a loose-fitting gap (relative to the width w) applies a weaker dampening force than the damper 114 having a tight-fitting gap because the prongs 116a, 116b would not exert as much clamping pressure on the lever arm 110 as the lever arm 110 moves through the gap. Rendering the dampening force of the damper 114 ineffective may create or allow greater instability within the regulator. In other words, widening a gap of the damper 114 might lead to abrupt and volatile movements of the lever arm 110 and the control element 112. The fixed lever and pin assembly 100, as described herein, would help prevent widening of the gap of the damper 114 because the fixed connection between the lever body 102 and the pin 104 prevents the lever arm 110 from swinging in the horizontal direction and prying the prongs 116a, 116b apart.

As used herein, the term "fixed lever and pin assembly" may refer to a device encompassing a single manufactured part or at least two fixed parts. As used herein, the term "rotatably coupled" refers to at least two elements that are substantially attached and may rotate relative to the other element. As used herein, the term "axis of the pin" or "horizontal axis" refers to an axis defined by A-A in FIG. 2, for example, the central axis of the pin 104. As used herein, the term "vertical" or "vertical direction" refers to a direction perpendicular to the A-A axis, i.e. the up and down direction in which the actuator moves.

FIG. 3 illustrates a perspective view of the fixed lever and pin assembly 100 isolated from the regulator body 101 of FIG. 2. The assembly 100 includes the lever body 102 having the front end 106, the back end 108, a top outer edge 120, and a bottom outer edge 122, wherein the top and bottom outer edge 120, 122 form a perimeter of the lever body 102. The arm 110 connects the front end 106 and the back end 108 of the lever body 102, and the arm 110 is adapted to operatively couple to an actuator of a fluid regulator. The pin 104 is fixed to the front end 106 of the lever body 102 and is disposed through the front end 106 in a direction generally perpendicular to a first parallel side 118a of the lever body 102. A lobe 124 extends from the bottom outer edge 122 of the lever arm 110 and is configured to be slidably received by the damper 114. The notch 126 is a rounded cut-out formed in the top outer edge 120 at the front end 106 of the lever body 102 and is adapted to slidably receive and rotatably couple to the coupler 113 of the control element 112 and retain the coupler 113 when the lever 102 is actuated.

FIG. 3 illustrates the fixed lever and pin assembly 100 that is either manufactured as a single piece or by combining a separate pin 104 and a separate lever 102 to form an integrated unit. The pin 104 may be fixed to the lever 104 in one or more methods, including interference fit, pressure casting, part fit, welding, or the pin 104 and lever 102 may be manufactured as one piece without requiring attaching the pin 104 to the lever 102. The term "fixed" or "fixing" may include other known methods of combining two components such that the two components do not move independently from one another. The fixed lever and pin assembly 100 move together, and in the context of a fluid regulator, may rotate about the axis A-A of the pin 104. Just as the pin 104 is limited by the cavity walls, the lever 102 may not swing in any direction other than vertical as it rotates with the pin 104.

In one example, the lever 102 and the pin 104 are fixed by an interference fit, e.g. pressure fit, friction fit, and/or force fit, and is explained with the illustration of an exploded view of a lever and pin assembly 100 in FIG. 4. The lever and pin assembly 100 includes a separate lever 102 adapted to receive a separate pin 104. An undersized aperture 103, that is, the aperture 103 is smaller than the pin 104, is formed in a front end 106 of the lever 102 and is adapted to receive the similarly shaped oversized pin 104. In the illustrated example, a dashed circle 105 surround the aperture 103 represents the oversized shape of the pin 104 relative to the undersized aperture 103. The aperture 103 provides a mating surface 128 that is adapted to mate with a mating surface 130 of the pin 104. The aperture 103 provides a shape that corresponds to the shape of the pin, meaning the aperture 103 of the lever 102 and a cross-section of the pin 304 are similarly shaped. In this case, the aperture 103 and the pin 104 are circular, however, other shapes are also possible. In the illustrated example, a diameter of the aperture $d_A$ and a diameter of the pin $d_P$ are different sizes. The pin 104 may be forcibly pushed through the undersized aperture 103 because the pin diameter $d_P$ is slightly larger than the aperture diameter $d_A$. Once the pin 104 is forcibly pushed through the aperture 103, the mating surface 130 of the pin 104 is fixed to the mating surface 128 of the aperture 103 by tight frictional force strong enough to maintain the lever 102 in a fixed position relative to the pin 104 under selected expected operational conditions. An interference fit may be achieved by shaping the lever 102 and/or the pin 104 such that the aperture 103 of the lever 102, the mating surface 130 of the pin 104, or both, may slightly deviate from its original size when the pin 104 is forcibly pushed through the aperture 103. The aperture 103 and/or the pin 104 may slightly deform to fit the pin 104 in the aperture 103, applying a tensile force to the aperture mating surface 128 and applying a compressive force to the mating surface 130 of the pin 104, resulting in a high frictional force between the lever 102 and the pin 104. In this case, the lever 102 is shaped to facilitate deformation of the lever aperture 103 to fit the pin 104 by providing a beveled trim 132 that is disposed around the aperture 103 on at least one parallel side 118a of the lever 102. Once the pin 104 is pushed through the aperture 103, the beveled trim 132 may increase in thickness to accommodate the interfering pin 104. As used herein, "mating surface" is an outer surface that is adapted to mate and fix to a second mating surface.

Figure 5:
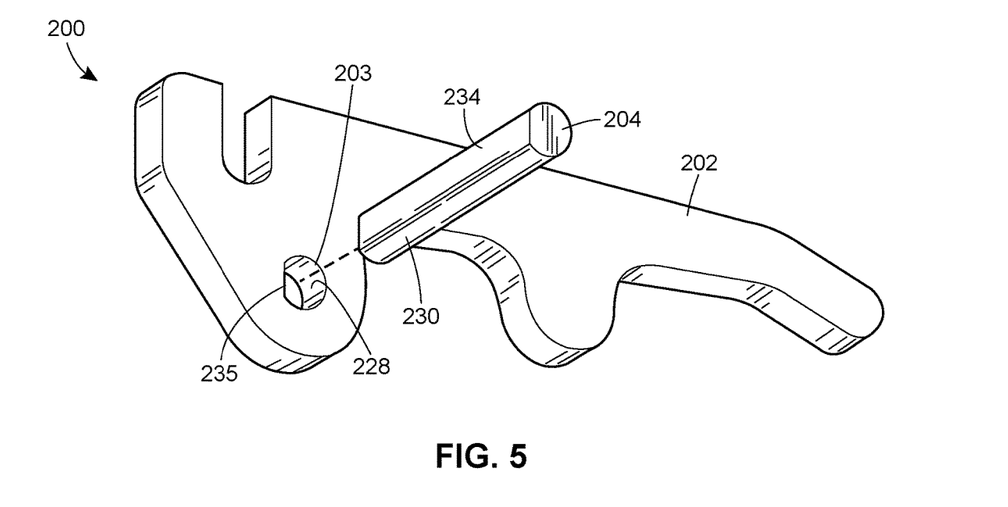
FIG. 5 is an exploded perspective view of an exemplary fixed lever and pin assembly having non-circular mating surfaces.

Referring now to another arrangement, FIG. 5 illustrates an exploded, perspective view of a fixed lever and pin assembly 200 where a non-circular pin 204 may be fixed to a lever 202 having a non-circular aperture 203. In the illustrated example, the pin 204 includes a non-circular cross-section having a flat edge 234 that corresponds to a similar non-circular aperture 203 having a flat edge 235. A mating surface 230 of the pin 204 is adapted to mate with a mating surface 228 of the aperture 203. Other embodiments of the fixed lever and pin assembly 200 may include any non-circular aperture 203 and pin 204 that obstructs free rotation of the pin 204 within the aperture 203. Once the pin 204 is fixed to the lever 202, the mating surfaces of the aperture and pin 228, 230 also prevent the lever 202 from rotating relatively to the pin 204 about the axis A-A of the pin 204. The non-circular pin 204 differs from a round pin, such as the pin 44 illustrated in FIG. 1, because the flat edge 234 of the pin 204 prevents the pin mating surface 230 from rotating away from the corresponding flat edge 235 of the aperture mating surface 228. Moreover, the non-circular pin 204 may be pressure fitted to the non-circular aperture 203, for example, as described above relative to FIG. 4, or welded to the lever 202 once the mating surface 230 of the pin 204 is adjacent to the mating surface 228 of the aperture 203.

Increasing the force of friction between the lever and the pin may be achieved by increasing the frictional properties of a mating surface of the pin and/or a mating surface of the aperture. For example, the pin and/or the lever may be casted or modified to provide a plurality of ridges, dimples, and/or knurls at the mating surfaces to enhance the frictional properties of the pin and to apply a frictional force to the mating surface the aperture. By applying a frictional force between the mating surfaces of the aperture and the pin, the lever is prevented from rotating relative to the pin and from sliding horizontally along the axis of the pin. As explained before, reducing the independent movement of the lever relative to the pin reduces instances of instability within the regulator. The lever and pin assembly may be manufactured as a single device or separately from any suitable material, including but not limited to, aluminum, brass, copper, magnesium, steel, ceramic, plastic, and the like. The lever and pin assembly may be manufactured as a single piece by casting, welding, machining, or other suitable methods. The lever and pin assembly may be assembled to form a single unit by the force fitting described above and/or by thermal expansion or shrink fitting.

Figure 6:
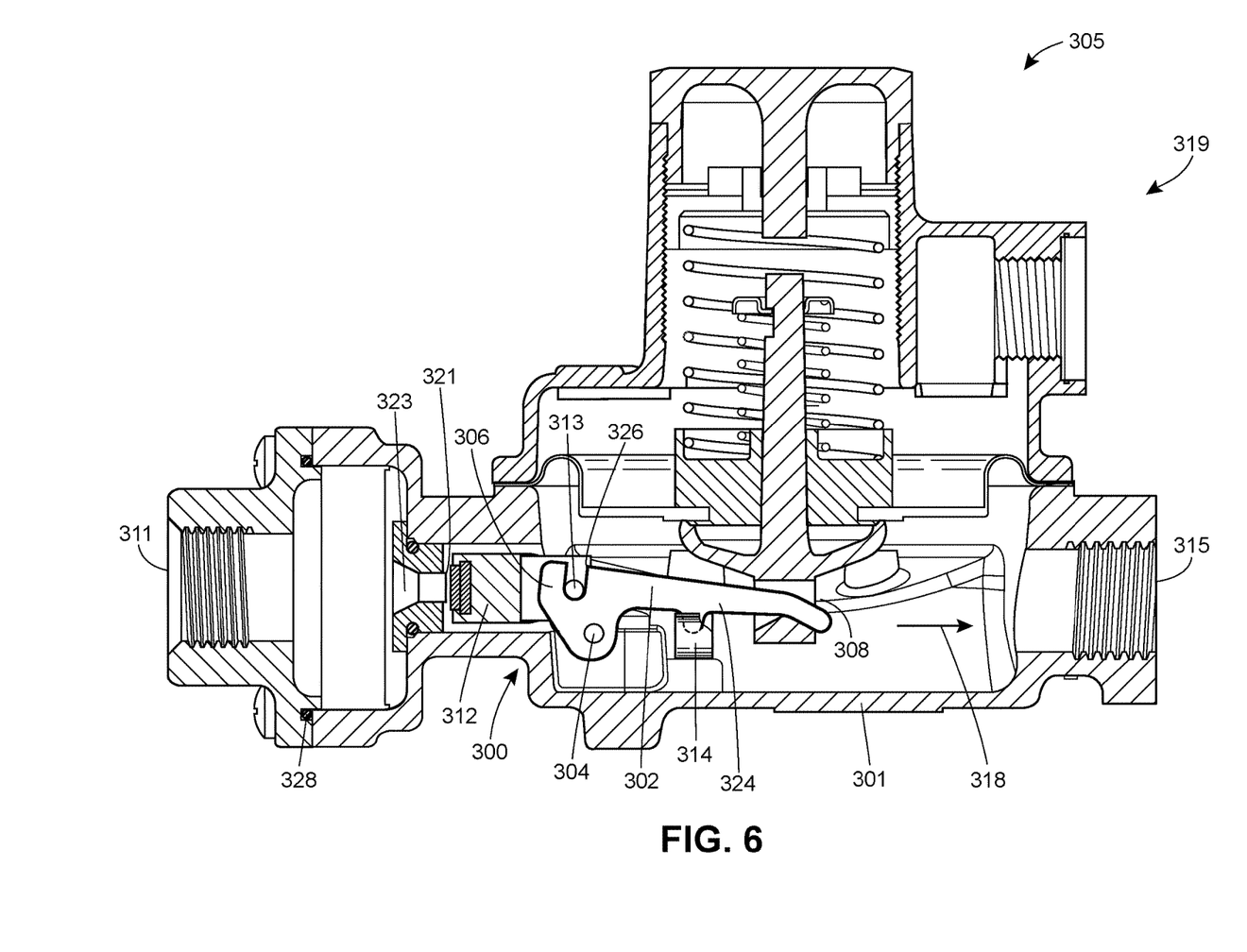
FIG. 6 is a cross-sectional view of a single stage fluid regulator with the fixed lever and pin assembly of FIG. 3.

FIG. 6 illustrates a cross-sectional view of a fixed lever and pin assembly 300, which may correspond to any of the fixed lever and pin assemblies described herein, including a lever body 302 and a pin 304 installed in a single stage regulator 305. The fluid regulator 305 includes an inlet 311 and an outlet 315 and control element 312 disposed in a fluid flow path 318 between the inlet 311 and the outlet 315. An orifice 323 is disposed in the fluid flow path 318 leading to a valve seat 321. The control element 312 is shiftable between an open position (as shown in FIG. 6) in which the control element 312 is spaced away from the valve seat 321, and a closed position in which the control element 312 is seated against the valve seat 321. The fixed lever and pin assembly 300 is operatively coupled to the control element 312 at a front end 306 of the lever body 302 and operatively coupled to an actuator 319 at a lever arm 310 at a back end 308 of the lever body 302. As the actuator 319 moves the lever arm 310 downward in the vertical direction, the fixed lever and pin assembly 300 rotate about an axis of the pin 304 and move the control element 312 away from a seat 321. Optionally, a damper 314 may squeeze a lobe 324 of the lever 302 to provide a dampening force. A notch 326 formed in the front end 306 of the lever 302 and coupled to a coupler 313 of the control element 312. An O-ring 328 is assembled on an inlet fitting. In other embodiments, the coupler 326 of the lever 302 may be any form that fastens to any coupler 313 of a control element 312.

Figure 7:
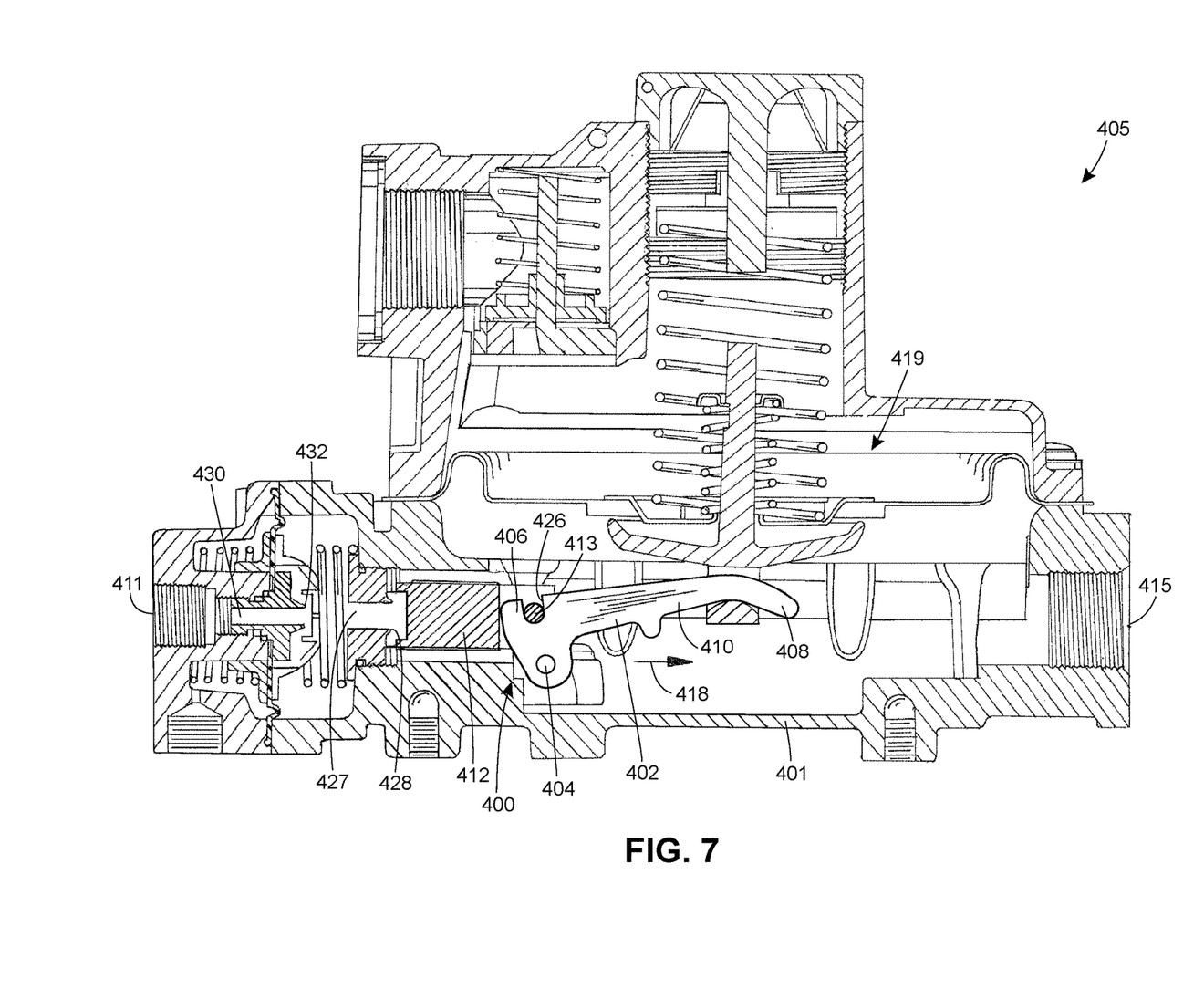
FIG. 7 is a cross-sectional view of a dual stage fluid regulator with the fixed lever and pin assembly of FIG. 3.

FIG. 7 illustrates a cross-sectional view of a dual stage fluid regulator 405 including a fixed lever and pin assembly 400, which may correspond to any of the fixed lever and pin assemblies described herein. The dual stage regulator 405 reduces inlet pressure to the outlet pressure in two steps. The regulator 405 has an inlet 411, an outlet 415, and a fluid flow path 418 connecting a first stage and a second stage. The fluid regulator 405 includes a first stage orifice 427 disposed in the fluid flow path 418 and leading to a first stage seat 428, and a second stage orifice 430 disposed in the fluid flow path 418 and leading to a second stage seat 432. A first stage control element 412 is disposed within the fluid flow path 418 and is shiftable between an open position (as shown in FIG. 7) in which the first stage control element 412 is spaced away from the first stage seat 428, and a closed position in which the first stage control element 412 is seated against the first stage seat 428. The fluid regulator 405 includes an actuator 419 which is attached to the regulator body 401. The actuator 419 is attached to or otherwise operatively coupled to the first stage control element 419 via the fixed lever and pin assembly 400 and is arranged to respond to fluid pressure changes in the fluid outlet 415 and to move the first stage control element 412 between the open position and the closed position in order to control the flow of the process fluid through the first stage orifice 427. The actuator 419 may be conventional, and moves a lever body 402 of the fixed lever and pin assembly 400 to open or close the first stage control element 412, depending on pressure conditions. A coupler 413 of the first stage control element 412 is operatively coupled to a notch 426 formed in the fixed lever and pin assembly 400 at a front end 406 of the lever 402, and the actuator 419 is operatively coupled to a back end 408 of the lever 402. Unlike the lever 38 and the pin 44 illustrated in FIG. 1, the fixed lever and pin assembly 400 moves as an integrated unit about an axis of the pin 404. The fixed lever and pin assembly 400 provides stability within the fluid regulator 405 because the lever 402 and the pin 404 are not rotatably connected, but are fixed at the front end 406 of the lever 402, and do not rotate independently from each other. As illustrated in both FIGS. 6-7, the fixed lever and pin assembly 300, 400 may operate in any fluid regulator that may use a lever and a pin assembly to operatively couple an actuator to control element. The fixed lever and pin assembly 300, 400 may be fixed by any of the discussed methods of fixing.

What is claimed is:

1. A fluid regulator, comprising:
   a regulator body having a fluid inlet and a fluid outlet connected by a fluid flow path;
   a seat defining an orifice disposed in the fluid flow path;
   a control element disposed within the fluid flow path and shiftable between an open position spaced away from the seat and a closed position seated against the seat;
   an actuator attached to the regulator body;
   a lever and pin assembly including a lever fixed to a pin, wherein the lever includes a front end operatively coupled to the control element and a back end operatively coupled to the actuator;
   a cavity formed in the regulator body, the cavity including a plurality of cavity walls at least partially surrounding the pin when the pin is disposed in the cavity;
   a damper installed in the regulator body, wherein the lever includes a lobe disposed between the front end and the back end of the lever and arranged to engage with the damper when the control element is in the open position;
   wherein the pin includes a central axis and is rotatable relative to the regulator body about the central axis;
   wherein the actuator is arranged to respond to fluid pressure changes in the fluid outlet by moving the back end of the lever in a vertical direction, causing the control element to move between the open position and the closed position to control flow of the process fluid through the orifice; and
   wherein the plurality of cavity walls are arranged to restrict a horizontal movement of the lever and pin assembly within the fluid regulator.

2. The regulator of claim 1, the pin attaches to the lever at an aperture in the front end of the lever, and wherein a mating surface of the aperture fixedly mates with a mating surface of the pin preventing the lever from moving independently from the pin.

3. The regulator of claim 1, wherein the pin is secured in the cavity of the regulator body, the cavity adapted to prevent vertical movement of the pin.

4. The regulator of claim 1, wherein the lever includes an aperture of a first diameter and the pin includes a second diameter, the second diameter being larger than the first diameter, whereby the pin is friction-fitted to the lever via the aperture.

5. The regulator of claim 1, wherein the lever further comprises a non-circular aperture adapted to receive the pin, and the pin comprises a non-circular cross-section that corresponds with the non-circular aperture.

6. The regulator of claim 1, wherein the lever and pin are fixed to each other by welding.

7. The regulator of claim 1, comprising a second orifice disposed in the fluid flow path and leading to a second stage seat, a second control element disposed within the fluid flow path and shiftable between an open position spaced away from the second stage seat and a closed position seated against the second stage seat, the second control element arranged to respond to fluid pressure changes to control flow of the process fluid through the second orifice.

8. The regulator of claim 1, wherein the pin and lever assembly is integrally formed.

9. A lever and pin assembly for a fluid regulator, the assembly comprising:
   a regulator body;
   a control element disposed within the regulator body to control flow of fluid through the regulator body;
   a lever having a front end and a back end, the front end operatively coupled to the control element;
   a pin fixed to the lever and having a central axis disposed through the front end of the lever, the pin rotatably coupled to the regulator body and rotatable relative to the regulator body about the central axis;
   a cavity formed in the regulator body and having a plurality of cavity walls at least partially surrounding the pin when the pin is disposed in the cavity;
   a damper installed in the regulator body, wherein the lever includes a lobe disposed between the front end and the back end of the lever and arranged to engage with the damper when the control element is in the open position;
   wherein rotation of the lever about the central axis of the pin moves the control element between a first position and a second position; and
   wherein the plurality of cavity walls are arranged to restrict horizontal movement of the lever and pin assembly in the regulator body.

10. The assembly of claim 9, wherein the lever further comprises a non-circular aperture that receives the pin, the pin having a non-circular cross-section that corresponds to the non-circular aperture.

11. The assembly of claim 9, wherein the lever includes an aperture of a first diameter and the pin includes a second diameter, the second diameter being larger than the first diameter, wherein the pin is friction-fitted to the lever via the aperture.

12. The assembly of claim 9, wherein the lever and pin are fixed to each other by welding.

13. The assembly of claim 9, wherein the lever is fixed to the pin by friction-fit.

14. The regulator of claim 9, wherein the pin is secured in the cavity of the regulator body, the plurality of cavity walls adapted to prevent vertical movement of the pin.

15. A method of improving stability in a fluid regulator, the method comprising:
   providing a fluid regulator having a regulator body with a fluid inlet and a fluid outlet connected by a fluid flow path, the regulator further having an orifice disposed in the fluid flow path and a seat, a control element disposed within the fluid flow path and shiftable between an open position spaced away from the seat and a closed position seated against the seat, and an actuator for attachment to the regulator body;
   providing a lever and pin assembly to be carried by the regulator body, the lever and pin assembly comprising a lever and a pin, the lever having a first end and a second end;
   providing a damper installed in the regulator body, wherein the lever includes a lobe disposed between the first end and the second end of the lever and arranged to engage with the damper when the control element is in the open position;
   operatively coupling the lever and pin assembly to the control element at the first end of the lever;
   operatively coupling the lever and pin assembly to the actuator at the second end of the lever, wherein the actuator is arranged to respond to fluid pressure changes in the fluid outlet and to move the second end of the lever in a vertical direction, causing the control element to move between the open position and the closed position to control flow of the process fluid through the orifice; and fixing the lever to the pin so that the lever does not move relative to the pin to prevent the lever from moving horizontally within the regulator when such movement is not caused by the control element and to prevent the lever from moving independently from the pin.

16. The method of claim 15, wherein the step of fixing the lever to the pin includes disposing the pin within a aperture through the lever and welding the pin to the lever.

17. The method of claim 15, wherein the step of fixing the lever to the pin includes force-fitting the pin having a non-circular cross section into a corresponding, non-circular aperture of the lever.

18. The method of claim 15, wherein the step of fixing the lever to the pin includes force-fitting the pin having a first diameter into an aperture of the lever having a second diameter, wherein the first diameter is larger than the second diameter.

19. The method of claim 15, wherein the step of fixing the lever to the pin includes manufacturing the lever and the pin as an integrated part.

20. The method of claim 15, including providing a second orifice disposed in the fluid flow path and leading to a second seat, a second control element disposed within the fluid flow path and shiftable between an open position spaced away from the second seat and a closed position seated against the second seat, the second control element arranged to respond to fluid pressure changes to control flow of the process fluid through the second orifice.

* * * * *

UNITED STATES PATENT AND TRADEMARK OFFICE
CERTIFICATE OF CORRECTION

PATENT NO. : 10,316,987 B2  
APPLICATION NO. : 15/069446  
DATED : June 11, 2019  
INVENTOR(S) : Chen Jing et al.

Page 1 of 1

It is certified that error appears in the above-identified patent and that said Letters Patent is hereby corrected as shown below:

In the Specification

At Column 9, Line 35, "aperture and pin 228, 230" should be -- aperture and pin 203, 204 --.

At Column 10, Line 25, "coupler 326" should be -- coupler 313 --.

At Column 10, Line 47, "first stage control element 419" should be -- first stage control element 412 --.

Signed and Sealed this
Tenth Day of March, 2020

Andrei Iancu
*Director of the United States Patent and Trademark Office*